United States Patent [19]

Vancoppenolle et al.

[11] Patent Number: 5,084,227
[45] Date of Patent: Jan. 28, 1992

[54] PROCESS OF COOLING A HEATED POLYMER FILM

[75] Inventors: Géry Vancoppenolle, Weerde; Jan K. D. Keyzer, Schilde; Walter J. Rens, Hove; Patrick R. Van Put, Lier, all of Belgium

[73] Assignee: AGFA-Gevaert N. V., Mortsel, Belgium

[21] Appl. No.: 535,532

[22] Filed: Jun. 11, 1990

[30] Foreign Application Priority Data

Jun. 12, 1989 [EP] European Pat. Off. ........ 89201500.9

[51] Int. Cl.⁵ ........................................... B29C 47/88
[52] U.S. Cl. .................................. 264/555; 264/556; 264/562; 264/178 R; 264/211.18; 264/234; 264/237; 264/289.6; 264/345; 264/348
[58] Field of Search ............. 264/178 R, 345, 211.12, 264/348, 216, 290.2, 289.3, 211.18, 557–562, 289.6, 556, 555, 234, 237, 211.2; 425/66, 67, 71

[56] References Cited

U.S. PATENT DOCUMENTS

| | | | |
|---|---|---|---|
| 3,058,151 | 10/1962 | Gonsalves | 425/67 |
| 3,104,937 | 9/1963 | Wyckoff et al. | 425/66 |
| 3,277,519 | 10/1966 | Jones | 425/71 |
| 3,377,413 | 4/1968 | Jansson et al. | 264/559 |
| 4,093,695 | 6/1978 | Heirbaut | 264/290.2 |
| 4,293,508 | 10/1981 | Heirbaut et al. | 264/289.6 |
| 4,548,778 | 10/1985 | Fuji | 264/178 R |
| 4,892,689 | 1/1990 | Van Cappellen et al. | 264/289.6 |

FOREIGN PATENT DOCUMENTS 77-09545 3/1978 Netherlands ............. 425/71

Primary Examiner—Jeffery Thurlow
Attorney, Agent, or Firm—William J. Daniel

[57] ABSTRACT

A process for cooling a heated polymer film by applying to both surfaces of the heated film, a cooling liquid adapted for wetting contact with the film surfaces. The viscosity of the layers of liquid adhering to the film surfaces is significantly reduced to facilitate removal of such liquid layers. The viscosity can be reduced by significantly raising the temperature of the adhering liquid layers after the film has been sufficiently cooled or by changing the adhering liquid to a different liquid of lower viscosity. Preferably, the liquid layers are removed for the film surfaces by conveying the liquid carrying film upwardly to cause the liquid layers to each form into a generally triangular shape with the vertex extending upwardly and blowing air stream downwardly against each such vertex.

18 Claims, 2 Drawing Sheets

PROCESS OF COOLING A HEATED POLYMER FILM

BACKGROUND OF THE INVENTION

1. Field of the Invention

The present invention relates to a process of cooling a heated polymer film by conveying the film through a body of cooling liquid and next removing cooling liquid that remains adherent to the film after the film has left the cooling liquid body. The invention relates in particular to a process of longitudinally stretching a molecularly orientable polymer film.

2. Description of the Prior Art

In the extrusion process of making polymer film, the molten polymer is extruded through a slot-like orifice and the extruded polymer is received on a quenching drum on which the temperature of the extruded film is lowered sufficiently rapidly through the softening range of the polymer to obtain a substantially amorphous film. By stretching the quenched film longitudinally and transversely while the film is at the lower end of the softening range, above the second order transition temperature of the polymer, the film can be subjected to molecular orientation leading to an improvement in various physical properties of the film, notably the tensile strength.

The longitudinal stretching of the film is usually achieved by passing the film first around a series of slowly rotating rollers and then around a series of rollers which are rotated more rapidly, and by heating the film between the two series of rollers to a temperature such that the film undergoes plastic elongation under the traction forces imposed on it due to the different speeds of the two series of rollers.

The cooling of the film after stretching is effected by cooling the more rapidly rotating rollers to a temperature well below the second order transition temperature of the film. The described steps of heating, cooling and stretching a film are disclosed in U.S. Pat. No. 4,093,695 relating to a process for making polymer film.

This process shows certain disadvantages the most important of which are as follows.

The stretching span, that is the length of the film path over which the stretching occurs, is rather long and in consequence there is appreciable "necking-in" of the film which causes beaded edges of the film.

Further, the alternating contact of the film with the successive cooling rollers causes curving stresses in the film which produce a non-uniform heat transfer across the width of the film.

Finally, there is the reduction of the surface quality of the film owing to its contact with traction rollers while the film is under stretching forces.

There has been provided an improved longitudinal stretching process which considerably reduces the disadvantages mentioned hereinbefore. This process comprises preheating the film to raise film temperature, but not so high for plastic film elongation to occur, then stretch-heating the film to a temperature at which instant plastic elongation occurs under the stretching forces, and finally rapidly cooling the film by immersing the film in a bath of cool water. This process is disclosed in EU B1 0 022 278.

While this process serves to overcome the mentioned difficulties, it shows in practice the disadvantage that the production speed is limited because above a certain film speed, it becomes difficult to satisfactorily remove the cooling water from the film.

As a matter of fact, it has been shown that the removal of cooling water by passing the film over successive squeeze rollers does not lead to a complete removal of the water, and that the removal of the residual water that adheres to the film in the form of isolated droplets or islands of liquid, by means of air knives or the like, is very difficult, if not impossible. The removal of cooling water from the film by squeeze means in the form of rubber bars does not produce better results. The removal of the cooling water by means of air knives produces slightly better results but still leads to production speeds which are limited in practice to approximately 50 m.min-1. It is of course possible to remove remaining water from the film by drying, but this is not desirable in practice since this step requires a large amount of energy. Moreover, the drying of the film causes drying stains on the film surface which form a problem in case the film will be used as a photographic support that will bear a transparent image.

SUMMARY OF THE INVENTION

Object of the Invention

It is an object of the invention to provide an improved process of cooling a heated polymer film by the application of a cooling liquid to the film, wherein the removal of liquid from the cooled film can proceed easier and at higher film speeds than with the prior art processes.

Statement of the Invention

According to the present invention, a process of cooling a heated polymer film by applying cooling liquid to both surfaces of the heated film and, after the temperature of the film has decreased sufficiently, removing the cooling liquid from the film, is characterized by performing the removal of the cooling liquid from the film by replacing the wetting contact of the film with the cooling liquid that adheres to the cooled film by a wetting contact of the film with a liquid with a viscosity which is smaller than that of the liquid which is initially in contact with the cooled film, and next removing the liquid with the smaller viscosity from the film by subjecting the film surfaces to squeegee forces.

The wetting of the film with a liquid of lower viscosity leads to an easier, i.e. a quicker and more complete removal of the liquid from the film.

According to one embodiment of the process according to the invention, the replacement of the wetting contact of the cooled film with the initial liquid by a wetting contact with a liquid with a smaller viscosity, is done by passing the film through a heated zone, thereby to increase the temperature of the cooling liquid adhering to the cooled film and decrease thereby its viscosity.

According to another embodiment of the inventive process, the replacement of the wetting contact of the film with the initial liquid by the wetting contact with a liquid with a lower viscosity, occurs by passing the film through a body of such liquid with a lower viscosity, e.g. through an open tank filled with such liquid. Such liquid with a lower viscosity may be basically the same as the cooling liquid, but at a higher temperature whereby its viscosity is lower, but said liquid may also be a different one having the desired lower viscosity.

It is of advantage that the film leaves the tank upwardly without any contact with any guide roller over a distance that is sufficiently extended for liquid peaks to form at either filmside. The term "liquid peak" stands in the present description for a layer of liquid carried on a film surface that has the general shape of an elongated equilateral triangle, the base of the triangle being at or near the free or exposed surface of the liquid in the tank, and the top of the triangle being located at a height that may range up to several meters above the base. The triangular shape of the liquid peak is a geometric form that establishes itself as a consequence of a dynamic equilibrium between the viscosity and the surface tension of the liquid, and the speed of the film.

The included peripheral edges of the triangle forms virtually a boundary or demarkation between the wet and the dry film surface regions. Yet there may be small amounts of residual liquid that do not remain within the liquid peak boundaries but that may become carried along by the film at the central region of the film, usually in the form of isolated droplets. This phenomenon occurs in particular at higher film speeds.

According to a suitable embodiment of the invention, such residual liquid is removed from the film by means of blasts of pressurized air which urge residual liquid downwardly, back into contact with the top of a liquid peak.

A satisfactory position for said air blasts is just downstream, i.e. considered according to the direction of movement of the film, of the top of a liquid peak.

Practice shows that at increasing film speeds, the height of a liquid peak may become large, and the higher a liquid peak, the smaller will be its top angle and concomitantly therewith the less becomes the height stability of its top, as practice shows. This means that at high speeds it becomes difficult to accurately position the airblasts, since if they are too far downstream of the actual position of the top of a liquid peak their effect is unsatisfactory, whereas if they are too close they may occasionally assume an upstream position, relative to the top of the liquid peak, what may cause the splitting or the rupturing of the liquid peak and consequently the end of the complete liquid removal.

According to a further embodiment of the invention, the height of liquid peak is reduced by splitting the liquid peak into two or more sub-peaks. This may be achieved according to one embodiment of the invention, by directing an air jet on the surface of a liquid peak, at a location near its base, whereby the integrity of the liquid layer is broken and instead two sub-peaks are initiated.

It has been found that under certain conditions of operation, a liquid peak is not formed spontaneously on the film as the film leaves the tank with the liquid with the lower viscosity, but instead the adherent liquid layer starts to contract laterally into a peak only after some decimeters of upward travel of the film. According to preferred embodiment of the process according to the invention, the initiation of the liquid peak formation on the film is assured by the application of forces that urge the edges of the adherent liquid layers towards each other in the plane of the film. Such forces may be established by blasts of pressurized air that are located next to the film edges, and that impinge against the film surfaces in a direction towards the centre of the film.

The invention is particularly useful in connection with the longitudinal stretching of a substantially amorphous polyethylene terephthalate film which is rapidly cooled after the stretching by its conveyance into a bath of cooling liquid, and therefore the examples which will be described hereinafter relate to the production of such film. However, the process according to the invention is also applicable in the cooling of heated polymer films in other situations, such as the quenching of a polymer film as the film leaves in molten state an extrusion die and must be rapidly cooled down to keep it in a substantially amorphous state.

BRIEF DESCRIPTION OF THE DRAWINGS

The invention will be described hereinafter by way of example with reference to the accompanying drawings, wherein.

Figure 1:
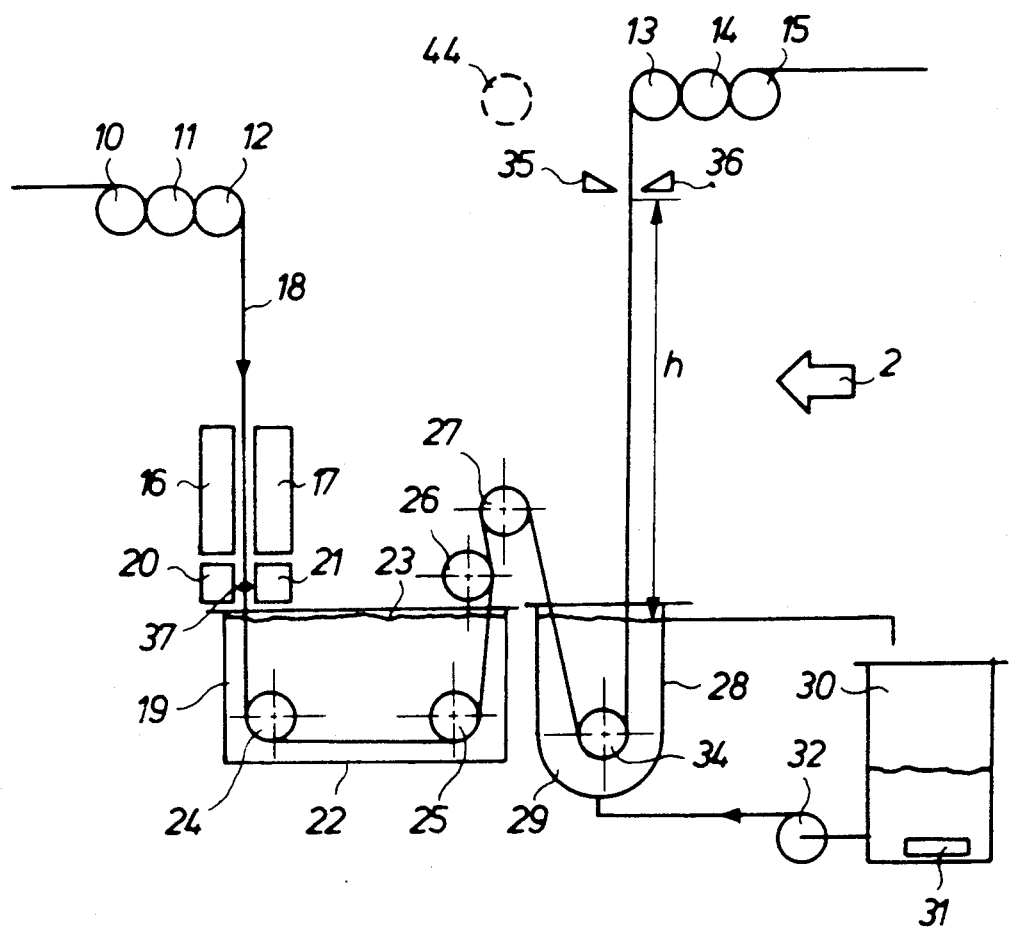
FIG. 1 is a diagrammatic view of one embodiment of an apparatus for longitudinally stretching and subsequent cooling a film in accordance with the invention.

Referring to the embodiment illustrated in FIG. 1, an apparatus for longitudinally stretching a polymer film comprises a series of three rollers 10, 11, and 12 driven by suitable means known in the art at a first speed $v_i$, and three rollers 13, 14, and 15 driven at a second speed $v_o$, the quotient of $v_o$ by $v_i$ determining the stretch ratio of the film.

The rollers 10 to 15 may be steel rollers having a highly polished mirrorlike surface finish as known in the art.

The function of the two series of rollers is to produce in the film web portion that extends between them, a longitudinal tensioning force that is suited for the longitudinal stretching of the film as the film has been heated to the stretching temperature.

The rollers have no proper thermal function in the present example of film stretching. This means that in principle the temperature of the rollers is equal to the temperature of the film entering into contact with them. It should be understood, however, that in practice small differences may exist between the temperature of the film and a roller contacted thereby.

The preheating of the film occurs by first IR-heaters 16 and 17 located symmetrically at either side of the path of the film 18. The heating of the film to the stretching temperature occurs by second IR-heaters 20 and 21 located likewise symmetrically at either side of the path of the film.

The cooling of the stretched film occurs by conveying the film into a body of cooling water 19 contained in a tank 22. The level of the liquid is indicated by the line 23.

The guidance of the film through the cooling station occurs by freely rotatable rollers 24 and 25 immersed in the cooling water.

Further details about the illustrated apparatus for longitudinally stretching, and for cooling a polymer film by conveying it through a bath with cooling water, may be found in EU B1 0 022 278 referred to in the introduction of this specification.

The cooled film leaves the cooling station over freerotating rollers 26 and 27 which squeeze off a substantial part of the cooling water that adheres to the film.

The film is then conveyed through a tank 28 that contains a body of water 29 the viscosity of which is lower than the viscosity of the cooling water 19. A vessel 30 contains a supply of water 29 which is maintained at a constant temperature by heating means 31. A pump 32 maintains a circulation of water through the station 28. The station 28 is provided with overflow means or the like for maintaining the water at a constant level 33.

The film is pulled about roller 34 which is mounted for free rotation in the station 28, and then moves straight upwardly towards the traction rollers 13, 14 and 15.

The film that leaves the tank 28 in the direction of the roller 13 shows on each surface a water peak with a height h. The base of the water peaks coincides practically with the water level 33, see FIG. 2 which is a partial view of FIG. 1 according to the arrow 2.

The top 39 of the water peak is slightly rounded, with a radius that is difficult to measure but that is estimated to range between one and some centimeters.

The free surface of the water peak is not quiescent but bears a plurality of strand-like watermasses i.e. streams or rivulets that run vertically downwardly and that continuously undergo slight lateral displacements in operation.

These downwardly flowing rivulets of water, together with the less conspicuous more quiescent watermasses between them, are in equilibrium with the amount of water that is removed by the film from the bath per unit of time.

The included peripheral edges of the water peak are remarkably stable and form a clear boundary between the wet and the dry surface regions of the film, except for the top 39 of the water peak where it is shown that as the film speed increases, there is an increasing amount of water droplets that are separated from the waterpeak and are carried along with the film. This phenomenon extends over a width of several centimeters, depending on the the top angle of the water peak, and the speed of the film.

The water droplets that are separated from the top of the waterpeak and carried along by the film, are removed from the film by air blasts from nozzles 35 and 36 that blow the residual water back into contact with the top of the water peaks whereby said water is carried off towards the body of water 29.

In operation of the system, it is further shown that at increasing film speeds the establishing of the water peaks may become uncertain, in a sense that the base 38 may become displaced upwardly up to a level as indicated by way of example by the broken line 41, so that the water peak becomes correspondingly higher located and the top 39 may reach a position beyond the nozzle 36.

Although a re-adjustment of the nozzle may solve the problem, the operation of the installation remains critical since the level 41 at which the base of the water peak is formed is unstable so that the position of the water peak varies, and so does the top 39 with respect to the nozzle 36.

Figure 2:
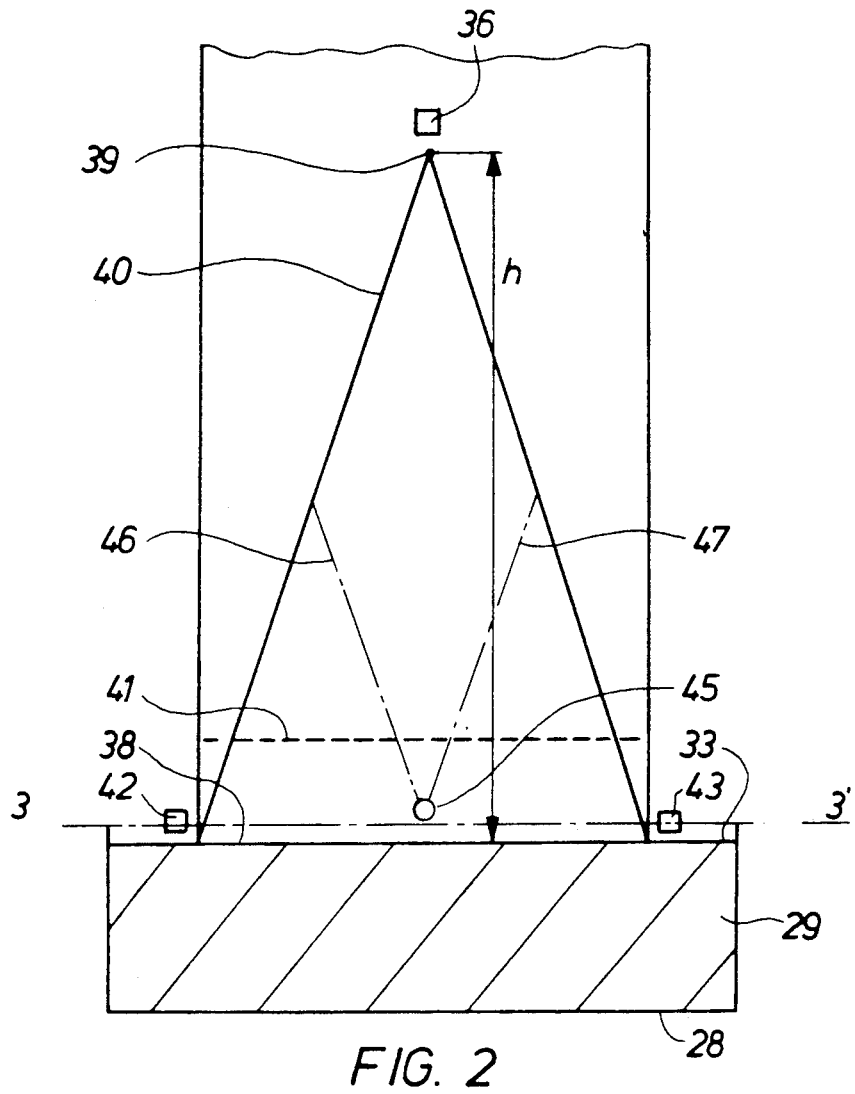
FIG. 2 is a view according to the arrow 2 of FIG. 1.
Figure 3:
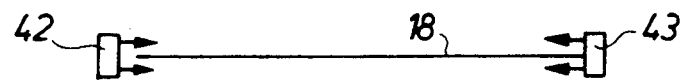
FIG. 3 is a horizontal sectional view on line 3—3' of FIG. 2.

Therefore, it is desirable to take measures to promote the initiation of the water peaks. In the present embodiment, such measures comprise the use of air blasts produced by nozzles 42 and 43 that are placed near the edges of the film, as shown in FIG. 2, and in FIG. 3 which is a horizontal sectional view of FIG. 2 on line 3—3'.

The nozzles 42 and 43 each have a horizontal slotlike opening with a length of approximately 2 cm, and they produce air blasts located in a horizontal plane that strike along both surfaces of the film and that urge the edges of the layers of water that adhere at either film surface towards each other i.e. towards the center of the film whereby the triangular shape of the adherent water layer is instantly initiated. A suitable position for the nozzles 42 and 43 is both from one to approximately five centimeters above the level 33 of the water 29.

The improvement which may be obtained by means of the process according to the present invention, is illustrated by the following examples, example 1 illustrating the operation of the system according to FIG. 1, and example 2 relating to a system in accordance with EU B1 0 022 278 which comprises the cooling station 22 without the rollers 26, 27 and the tank 28, so that the film is conveyed directly upwardly from roller 25 towards the traction rollers.

EXAMPLE 1

A polyethylene terephthalate polymer having an inherent viscosity of 0.57 dl.g$^{-1}$ was extruded at a temperature of 290° C. by an extrusion die having a film forming orifice. The molten polymer was received on quenching drums which caused a film temperature of 37.0° C. as the film left the last quenching drum, and the amorphous film had a crystallinity of 0.4%. The film was fed to the rollers 10, 11, 12, which were maintained at a surface temperature of approximately 40° C. The film thickness amounted to 1100 mm.

The first set of IR-heaters 16 and 17 each comprised 10 parallelly spaced IR-lamps of the type "middle-wavelength", consuming each an electrical power of 50 Watts/linear cm. The maximum of the emission spectrum of the lamps was situated at a wavelength of approximately 2.3 um(micrometer). The length of the heaters 16 and 17, measured parallel with the direction of film movement, amounted to 25 cm. The temperature of the film leaving the heaters 16 and 17 mounted to 79° C.

The second set of IR-heaters 20 to 21 each comprised IR-lamps of the type "short-wavelength", and consuming each a power of 80 Watts/linear cm. The maximum of the emission spectrum of the lamps was situated at 1.2 um. The distance between the line 37 onto which the radiant energy was focussed on the film, and the level 23 of the cooling liquid, amounted to 20 mm.

The stretch ratio of the film was set to 1:3.4 by using a corresponding speed difference between the rollers 13, 14, 15 and 10, 11, 12. The corresponding stretch rate amounted to 200,000% min$^{-1}$.

The stretched film was pulled through the cooling station 22 that contained demineralized water as a cooling medium. The water was kept at a temperature of 20° C.

The film was then pulled through the station 28 that contained demineralized water as well, but that was kept at a temperature of 60° C.

The nozzles 35 and 36 had a horizontal opening measuring 0.5×0.5 mm, and were tilted downwardly over an angle of 75° with respect to the horizontal. The air pressure at nozzles 35 and 36 was 4 bar.

The air pressure at nozzles 42 and 43 was 4 bar.

It was found that the speed v of the stretched film could be increased up to 80 m.min$^{-1}$ before the water was no longer completely removed from the film by the air knives 35 and 36. The height of the waterpeak on both film surfaces amounted at that moment to h=4.0 m.

It should be understood that the air pressure and the rate of the air of the knives 35, 36 cannot be increased in indefinitely order yet to blow off residual liquid from the film surface beyond the top of the water peaks, since this may set the film in undesired vibration, it costs much energy, and it produces a noise level that is no longer acceptable for an unprotected operator.

EXAMPLE 2

The installation was modified by removing the rollers 26 and 27, and conducting the film from the roller 25 directly straight upwardly through the intermediary of an extra roller such as roller 44 illustrated in broken lines.

The air nozzles 35, 36 and 42, 43 were correspondingly displaced towards the new film path.

The stretching conditions being not changed, it was shown that the speed v of the stretched film could only be increased up to 65 m.min$^{-1}$ before the water was no longer completely removed from the film by the air knives 35 and 36. The height h amounted to 4.0 m.

The above examples illustrate that in the present case, the process according to the invention enabled to obtain a gain in production speed of almost 25%, with a negligible investment in the existing installation.

The invention is neither limited to the described example, nor to the illustrated embodiment.

The height of the water peaks may be reduced, and the stability of the location of the top of such peaks may be correspondingly increased, by adjusting the degree of acidity of the water of the tank 28 to a value which corresponds with a pH comprised between 3 and 6. As a matter of fact, it has been shown that a pH value amounting to e.g. 4 may lead to a further decrease of the height of a water peak by 35%. More information about this measure may be found in the co-pending application filed on even day herewith and entitled: "A process of cooling a heated polyethylene terephthalate film" now U.S. Pat. No. 5,028,691, issued July 2, 1991.

The height of the water peaks may also be reduced by splitting up each peak in two or more sub-peaks. This measure has been illustrated diagrammatically in FIG. 2, where an extra nozzle 45 produces an air blast that divides the water peak into two halves of almost equal width what results in two sub-peaks 46 and 47. Corresponding air nozzles must be provided just downstream of the top of such sub-peaks for operation similar to the nozzle 36 for the peak 40.

The improved removal of liquid from the film in accordance with the present invention is not necessarily limited to the formation of liquid peaks that flow down the film by gravity, since the operation of common liquid removing measures including rollers, scrapers, air knives and the like, all of which involve subjecting the film to a squeegeeing action, becomes easier as well by the replacement of the initial cooling liquid by a liquid with a reduced viscosity. However, the removal of adherent liquid, integrally along a transverse line of a film remains difficult since residual liquid which still will remain is very difficult to remove.

Finally, the application of the process according to the invention is not limited to polyethylene terephthalate as disclosed in the comparative examples, but it extends as well to other polymer films known in the art that lend themselves to molecular orientation by longitudinal stretching while they are at a suitable stretching temperature, or that are quenched by conveyance through a waterbath after casting.

We claim:

1. In a high speed process of cooling heated polymer film by contacting both surfaces of such film with a cooling liquid having a temperature below that of said heated film and which is adapted to make adhering wetting contact with such surfaces and, after the temperature of the film has decreased sufficiently, removing the final adhering liquid from the film surfaces, the improvement of facilitating the removal of the final adhering liquid from the film surface by reducing the viscosity of the final adhering liquid on the cooled film surfaces below the viscosity of the initially contacting cooling liquid, and subsequently removing the final adhering liquid with reduced viscosity from the film surfaces by subjecting the film surfaces to squeegee forces.

2. A process according to claim 1, wherein the viscosity of the final adhering liquid on the cooled film surfaces is reduced by replacing the original contacting cooling liquid with a liquid of lower viscosity.

3. A process according to claim 2, wherein such liquid of reduced viscosity has essentially the same composition as the original contacting cooling liquid, but is at a higher temperature than the original cooling liquid, whereby its viscosity is lower.

4. A process according to claim 1, wherein the heated film is cooled by passing the same through a bath of said cooling liquid from which the film emerges with adhering liquid on its surfaces and the viscosity of the final adhering liquid on the cooled film surfaces is reduced by passing the emerged film with the adhering cooling liquid thereon through a heated zone, thereby to increase the temperature of the liquid adhering to the film and thus decrease its viscosity before the same is removed by said squeegee forces.

5. A process according to claim 1, wherein the removal of the liquid with reduced viscosity occurs by conveying the film with the liquid in adhering wetting contact with its surfaces along a vertical path that is sufficiently long for such adhering liquid to form into liquid layers on the respective film surfaces, each such layer being generally in the shape of a triangle having its vertex directed upwards, and then removing the final adhering liquid remaining on the film surfaces from said liquid layers by subjecting the same to said squeegee forces.

6. A process according to claim 5, wherein the film is subjected to air squeegee forces downstream relative to the direction of movement of the film, from the vertices of the triangular shaped liquid layers by means of blasts of pressurized air impinging on its surfaces.

7. A process according to claim 6, wherein the blasts of pressurized air serve to bias any residual adherent liquid separated from the triangularly shaped liquid layers back into contact with such liquid layers.

8. A process according to claim 5, comprising promoting the formation of the triangularly shaped liquid layers on the upwardly moving film by urging the edges of the liquid layers that adhere to either film surface towards the longitudinal center of the film.

9. A process according to claim 8, wherein such urging is done by means of blasts of pressurized air that are located adjacent to the edges of the film at a location near the beginning of the vertical film path and directed generally toward the film center.

10. A process according to claim 5, wherein the height of each of the triangularly shaped layers of liquid adhering to either film surface is reduced by causing the same to sub-divide into at least two sub-triangles.

11. A process according to claim 10, wherein such sub-division is caused by directing an air jet against each triangular-shaped liquid layer, at a location near the beginning of the vertical path and intermediate the side edges of such layer, and then removing the final adhering liquid remaining on the film surfaces from the liquid sub-triangles by air squeegee forces directing air jets against the film surfaces downstream of the peaks of said sub-triangles.

12. A process according to claim 1, wherein the cooling liquid originally contacting said film is water of a given viscosity.

13. A process according to claim 12, wherein the final adhering liquid of the reduced viscosity is water having a lower viscosity than the originally applied water.

14. A process according to claim 1, wherein the film to be cooled is initially heated to a temperature above its second order transition temperature in order to longitudinally stretch the film, and wherein the temperature of the applied cooling liquid is lower than the second order transition temperature of the film, while the temperature of the final adhering layers of said reduced viscosity liquid is intermediate the applied cooling liquid temperature and the second order transition temperature of the film.

15. In a high speed process of cooling a heated moving polymer film by passing the heated film through a bath of a cooling liquid at a temperature below that of the heated film and which is adapted for adhering wetting contact with film surfaces and from which the film emerges after its temperature has been decreased sufficiently by the cooling liquid, and then removing from the film surfaces liquid remaining in adhering wetting contact therewith, the improvement of reducing the viscosity of the liquid in adherent wetting contact with the emerged film surfaces below the viscosity of the applied cooling liquid, conveying the film with the liquid of reduced viscosity in adhering wetting contact upwardly along a vertical path to cause the adhering reduced viscosity liquid to form into layers on the opposite film surfaces which layers are each of generally triangular shape with the vertex directed upwardly, and impinging upon the vertices of the triangularly shaped liquid layers generally downwardly directed streams of pressurized air to remove the adhering liquid layers from opposite film surfaces.

16. The method of claim 15, wherein the film is initially heated above its plastic deformation temperature and the viscosity of the liquid in adhering wetting contact with the respective film surfaces is reduced by heating the adhering liquid, after the film has been cooled below its plastic deformation temperature and has emerged from said cooling liquid bath, to decrease the viscosity of the adhering liquid, or by contacting the film after cooling below said plastic deformation temperature by said cooling liquid bath with a second liquid adapted for adhering wetting contact with the film surfaces and of reduced viscosity compared to said cooling liquid to leave on the film surfaces adhering layers of said second liquid for formation into said triangularly shaped layers.

17. A high speed method for longitudinally heat-stretching a moving substantially amorphous polyethylene terephthalate film comprising:
feeding said film by first driven roller means at a first speed to a zone through which the film passes unsupported along a generally fixed path,
removing said film by second driven roller means downstream of said zone from said zone at a second speed that is higher than said first speed to cause the film to be stretched,
heating said film to facilitate stretching thereof within said zone,
passing the heated film into a bath of cooling liquid into which the heated stretched film is introduced while unsupported,
below the level of the cooling liquid in said bath terminating the unsupported zone of the film by guide means in said liquid,
passing the cooled film into a second bath upstream of said second roller means, said second bath being of a liquid having a viscosity lower than that of the cooling liquid, and
impinging streams of pressurized air against the opposite film surfaces intermediate said second bath and said second roller means for removing the liquid of lower viscosity from the film before the film reaches said second roller means.

18. The method of claim 17, including the step of guiding said film upwardly along a generally vertical path upon emergence from said second bath on the way to said second roller means and said air streams are disposed along such vertical path spaced above the liquid level of said second bath.

* * * * *